United States Patent [19]

Chigira et al.

[11] Patent Number: 4,958,099
[45] Date of Patent: Sep. 18, 1990

[54] BRUSHLESS MOTOR

[75] Inventors: Tatsuo Chigira, Yokohama; Akira Kurosawa, Yokoze, both of Japan

[73] Assignees: Canon Kabushiki Kaisha; Canon Denshi Kabushiki Kaisha, both of Tokyo, Japan

[21] Appl. No.: 236,850

[22] Filed: Aug. 26, 1988

[30] Foreign Application Priority Data

| Sep. 3, 1987 | [JP] | Japan | 62-134935[U] |
| Sep. 17, 1987 | [JP] | Japan | 62-142030[U] |
| Sep. 17, 1987 | [JP] | Japan | 62-142031[U] |
| Sep. 17, 1987 | [JP] | Japan | 62-142032[U] |
| Nov. 16, 1987 | [JP] | Japan | 62-174792[U] |
| Nov. 16, 1987 | [JP] | Japan | 62-174793[U] |

[51] Int. Cl.$^5$ .......................... H02K 1/12
[52] U.S. Cl. .................. 310/254; 310/42; 310/71; 310/112; 310/185; 310/DIG. 6
[58] Field of Search .......... 310/40 MM, 49 R, 46, 310/71, 90, 91, 88, 68 R, 112, 156, 179, 180, 162, 163, 194, 177, 208, 216, 218, 254, 259, 185, 42, DIG. 3, DIG. 6; 354/234.1, 271.1

[56] References Cited

U.S. PATENT DOCUMENTS

| 4,141,210 | 2/1979 | Flaig | 58/23 |
| 4,274,026 | 6/1981 | Haydon et al. | 310/254 |
| 4,629,924 | 12/1986 | Grosjean | 310/257 |
| 4,648,701 | 3/1987 | Ogihara et al. | 354/439 |
| 4,782,353 | 11/1988 | Ogihara et al. | 354/234 |
| 4,806,813 | 2/1989 | Sumi et al. | 310/254 |
| 4,883,996 | 11/1989 | Aoki | 310/154 |

FOREIGN PATENT DOCUMENTS

| 58-15485 | 1/1983 | Japan . |
| 60-140934 | 9/1985 | Japan . |
| 60-141682 | 9/1985 | Japan . |
| 60-184234 | 9/1985 | Japan . |
| 61-44637 | 3/1986 | Japan . |

Primary Examiner—R. Skudy
Attorney, Agent, or Firm—Fitzpatrick, Cella, Harper & Scinto

[57] ABSTRACT

A brushless motor of the invention has a plurality of stator members in which arc-shaped magnetic pole portions are arranged around a periphery of a magnet rotor. One of the stator members is constructed such that a plurality of magnetic pole portions are continuously formed. For the number of parts, the number of stator members is smaller than the number of magnetic pole portions.

7 Claims, 11 Drawing Sheets

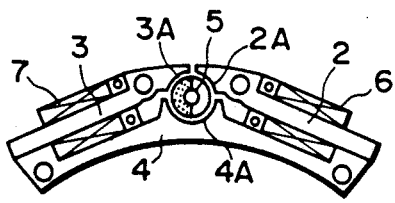
FIG. 3A
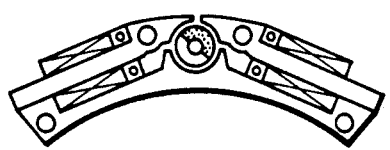
FIG. 3F
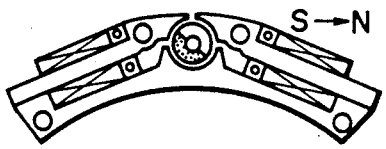
FIG. 3B
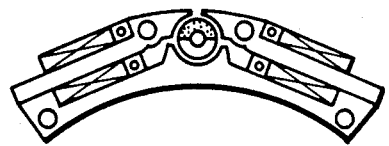
FIG. 3G
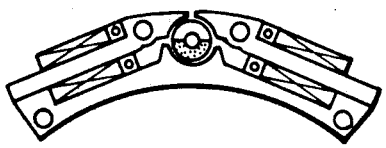
FIG. 3C
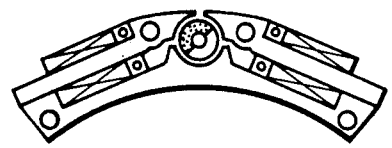
FIG. 3H
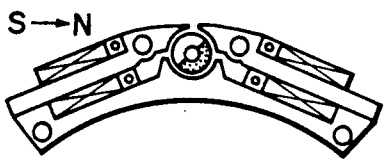
FIG. 3D
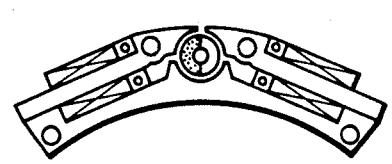
FIG. 3I
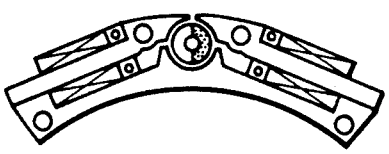
FIG. 3E
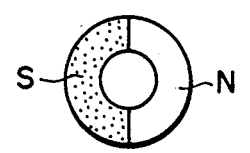

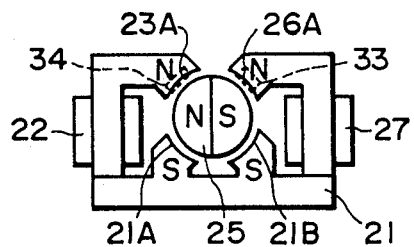
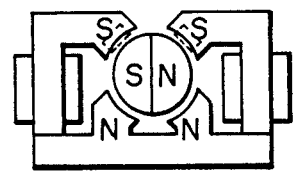
FIG. 14A        FIG. 14E
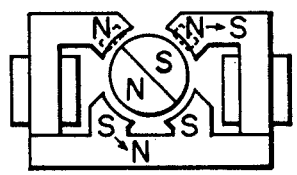
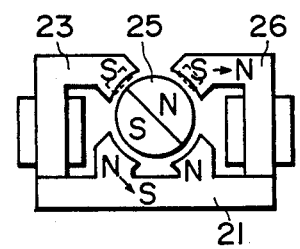
FIG. 14B        FIG. 14F
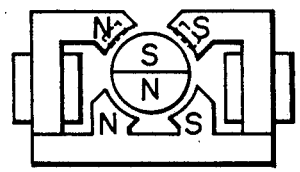
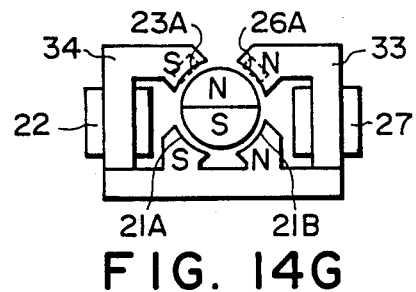
FIG. 14C        FIG. 14G
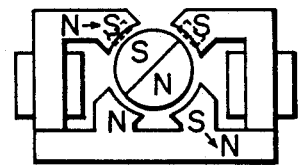
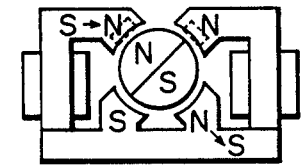
FIG. 14D        FIG. 14H

BRUSHLESS MOTOR

BACKGROUND OF THE INVENTION

1. Field of the Invention

The present invention relates to a structure of a brushless motor and, more particularly, to a brushless motor in which arc-shaped magnetic pole portions are arranged around a magnet rotor to thereby form a rectangular or arc shape as an overall shape.

2. Related Background Art

The same assignee as the present invention has already applied the above-mentioned arc-shaped brushless motor in U.S. patent application Ser. No. 027173, now U.S. Pat. No. 4,806,813.

In addition, as conventional brushless motors in which magnetic pole portions are arranged around a magnet rotor to thereby form an arc shape as an overall shape, there have been proposed brushless motors as disclosed in: Japanese Utility Model Application Nos. 59-26806, 59-26804, 56-107957, and 59-129607 (Japanese Utility Model Laid-open Nos. 60-140934, 60-141682, 58-15485, and 61-44637), Japanese Patent Application No. 59-39082 (JP-A-60-184234), and the like.

The foregoing conventional motor is used to control a sector of a shutter The motor comprises: a rotor which is rotatably supported and consisting of a permanent magnet which is magnetized by four poles in the radial direction; two stators each having a pair of U-shaped leg portions and in each of which a magnetic pole portion which faces the outer periphery of the rotor is formed in each end portion of the leg portions; and a coil to excite the stators. Further, the magnetic pole portions of the stators are formed so as to have a difference of 90° between their phases to the rotational center of the rotor. In a state in which the two stators do not overlap with each other on a plane, one of the magnetic pole portions of each of the stators is mutually closely arranged There is a difference of 45° between the phases of the closely arranged magnetic pole portions to the center of the rotor. The two stators are positioned so as to have a —character shape.

According to the motor with the structure such that the magnetic pole portions are formed at the edges of the U-shaped leg portions around the magnet rotor in the foregoing conventional techniques, in order to obtain the smooth rotation of the rotor, gaps (air gaps) between the rotor and the magnetic pole portions need to be uniform over the whole periphery of the rotor. Further, to raise the rotational torque, for the magnetic pole portions, in order to form opposite surfaces along the outer periphery of the rotor and to equalize the error gaps between the magnetic pole portions which construct each pair, a fixing method of the assembling positions of the rotor and leg portions also needs to be devised.

SUMMARY OF THE INVENTION

It is the first object of the invention to provide a motor in which at least four magnetic pole portions are arranged around the periphery of a rotor and the respective two of the four magnetic pole portions are constructed as a pair and the rotor and magnetic paths are formed, wherein two of the four magnetic pole portions are formed on a single stator member, thereby eliminating the difficulty in adjustment of the positions of the rotor and magnetic pole portions.

Another object of the invention is to provide a motor in which a stator member is constructed by three members, a magnetic pole portion of each stator member is formed like an arc, and a base plate to uniform the air gaps between the arc surfaces and the outer periphery of the rotor over the whole periphery is provided.

Specifically, still another object of the invention is to provide a motor having positioning means which can accurately assemble the foregoing three stators to the base plate at predetermined positions around the rotor.

Further another object of the invention is to provide a motor in which two of four magnetic pole portions are formed on a single stator member and which has stop members for enabling the magnetic pole portions of the other two stators to be directly magnetically connected with each stator member, to construct each pair of magnetic paths and for enabling a working efficiency of the assembling works of respective parts to be improved.

Another object of the invention is to provide a motor having a guide member which can accurately specify the mutual positions (arranging positions) of a rotor and a plurality of stators.

More specifically, the invention provides a motor in which the guide member or the base plate is formed with a portion on which is arranged a device to detect the magnetic pole of the magnet rotor, thereby enabling a detection accuracy to be improved.

Further another object of the invention is to provide a motor in which when assembling four magnetic pole portions which are formed by three stator members while mainly keeping a uniform gap around a magnet rotor, the positions of the respective members are accurately determined and there is no need to adjust the positions as little as possible.

BRIEF DESCRIPTION OF THE DRAWINGS

FIGS. 1 to 7 show a first embodiment of the present invention;

FIG. 1 is an perspective view of main component parts of a motor in the embodiment of the invention;

FIG. 2 is a front view of FIG. 1 in assembled condition;

FIGS. 3A to 3I are schematic views similar to FIG. 2 for explaining the operation of a motor;

FIG. 4 is an exploded perspective view of a modification of a construction shown in FIG. 1;

FIGS. 5 and 6 are explanatory diagrams of auxiliary yokes 11 and 12;

FIG. 7 is an exploded view of a motor in another modification;

FIGS. 8 to 15 show the second embodiment of the invention;

FIG. 8 is an exploded perspective view of a motor constituting a second embodiment of the present invention;

FIG. 9 is a front view of FIG. 8;

FIG. 10 is a cross sectional view of FIG. 9;

FIG. 11 is a cross sectional view of the main section of a guide member;

FIG. 12 is an explanatory view of the guide member;

FIG. 13 is a cross sectional view of the guide member taken along the line X—X in FIG. 12;

FIGS. 14A to 14H are explanatory diagrams of the operation of the motor in the second embodiment; and FIG. 15 is an exploded view of a modification of the motor of FIG. 8.

DESCRIPTION OF THE PREFERRED EMBODIMENTS

FIGS. 1 to 7 show the first embodiment of the present invention.

Figure 1:
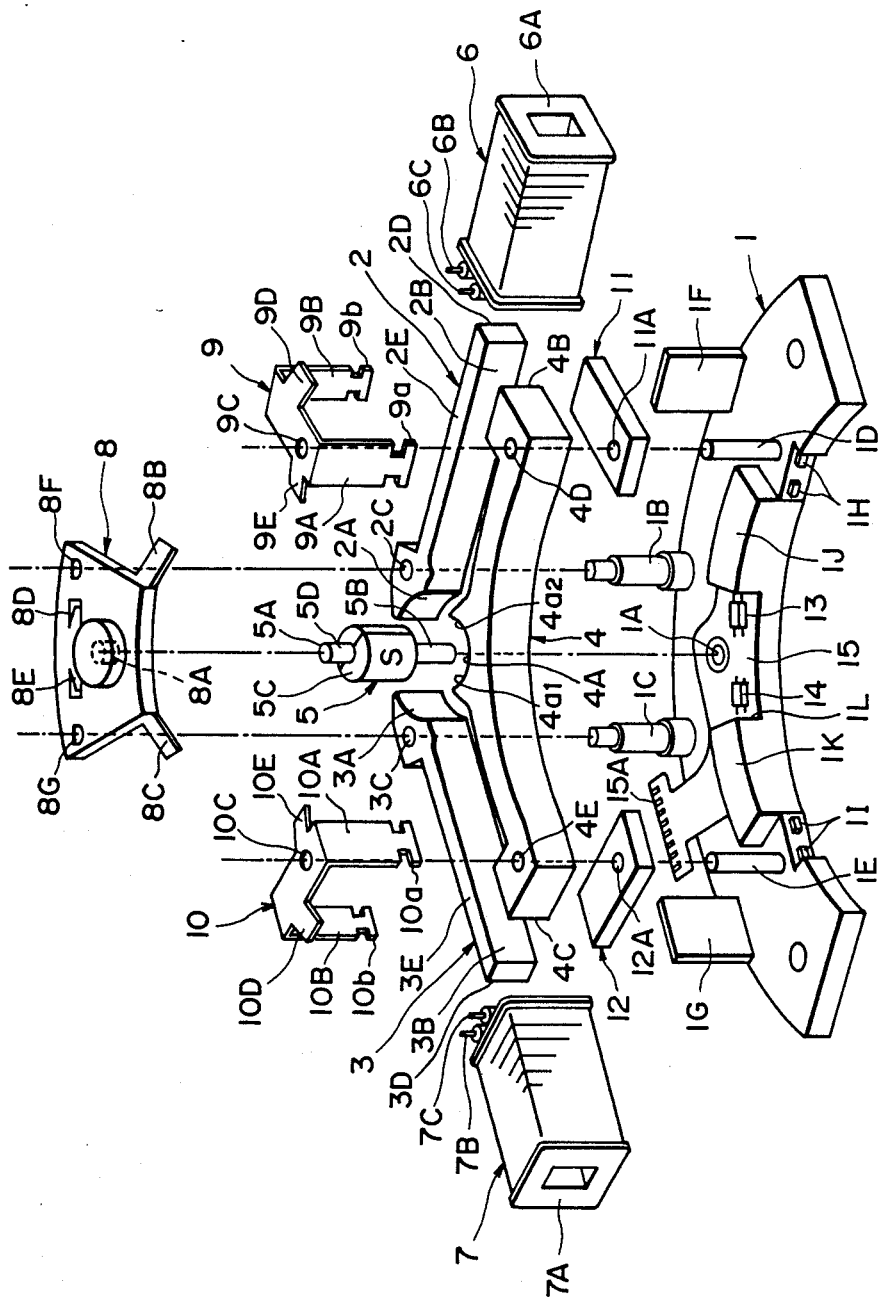
Figure 2:
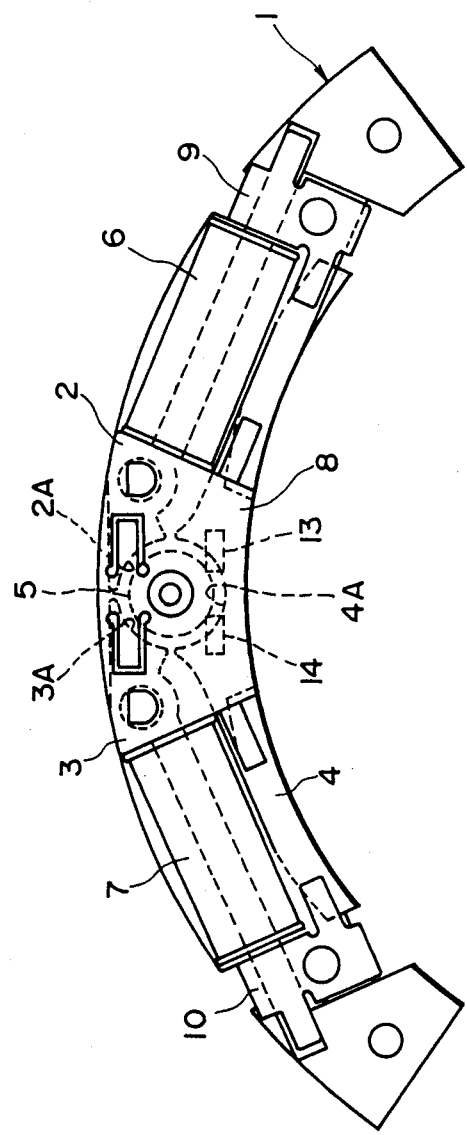

FIG. 1 is an exploded perspective view of the first embodiment of a brushless motor according to the invention. FIG. 2 is a front view of the brushless motor of FIG. 1.

As shown in FIGS. 1 and 2, a permanent magnet rotor 5 comprises: a cylindrical permanent magnet 5C magnetized to a plurality of poles; and shaft portions 5B and 5D. The rotor 5 is rotatably assembled by axially supporting the shaft portions 5B and 5D on both sides by using a bearing portion 1A formed on an almost arc-shaped base plate 1 made of plastic and a bearing portion 8A of a bearing member 8 which is fixed by a first pin 1B and a second pin 1C formed on the base plate 1.

A first stator 2 made of a magnetic material, for instance, silicon sheet steel is formed like a major axis and has an arc-shaped surface (opposite portion) 2A which faces the rotor 5 and whose opening angle is set to about 90°. A first armature coil 6, which is constructed by winding a coil around a bobbin 6A, is attached to a coil supporting portion 2E so as to penetrate surround it. On the other hand, the first stator 2 is positioned so that the air gap between the rotor 5 and an arc-shaped opposite surface (opposite portion) 2A (the first magnetic pole portion) is set to a predetermined value due to the engagement of a hole 2C by the first pin 1B formed on the base plate 1 and due to the contact of a first side surface 2D and a side surface of a first convex portion 1F formed on the base plate 1. Further, the first stator 2 is also positioned in the direction of the rotor axis due to a shoulder constituting a first level difference portion between a shoulder constituting a larger diameter portion and a smaller diameter portion of the pin 1B. The first pin 1B has the second shoulder or level difference portions and sequentially becomes more slender away from side of the base plate 1.

A major axis-shaped second stator 3 made of a magnetic material e.g., similarly laminated silicon sheet steel has an arc-shaped surface 3A which faces the rotor 5 and whose opening angle is set to about 90°. A second armature coil 7, which is constructed by winding a wire around a bobbin 7A is attached to a coil supporting portion 3E so as to surround it. On the other hand, the second stator 3 is positioned so that the air gap between the permanent magnet rotor 5 and an arc-shaped opposite surface 3A (the second magnetic pole portion) is set to a predetermined value due to the engagement of a hole 3C and the second pin 1C formed on the base plate 1 and due to the contact of a first side surface 3D and a side surface of a second convex portion 1G formed on the base plate 1. Further, the stator 3 is also positioned in the direction of a rotational axis due to a first level shoulder of the pin 1C. As shown in FIG. 1, the pin 1C has first and second shoulder or level difference portions and sequentially becomes more slender from the side of the base plate 1.

A third stator 4 made of such a magnetic material, laminated silicon sheet steel has an arc-shaped opposite surface (opposite portion) 4A which faces the rotor 5 and whose opening angle is set to about 180°. An arc-shaped opposite surface 4A has such a shape that an opposite surface $4a_1$ (an opposite portion on the other side) which faces the arc-shaped opposite surface (opposite portion) 2A (the first magnetic pole portion) of the first stator 2 through the rotor 5 and an opposite surface $4a_2$ (an opposite portion on the other side) which faces the arc-shaped opposite surface (opposite portion) 3A (the second magnetic pole portion) of the second stator 3 through the rotor 5, are connected as a single arc-shaped opposite surface (opposite portion). The opposite surface $4a_1$ is set to the third magnetic pole portion. The opposite surface $4a_2$ is set to be the fourth magnetic pole portion.

On the other hand, holes 4D and 4E are formed in the third stator 4. The holes 4D and 4E come into engagement with a third pin 1D and a fourth pin 1E formed on the base plate 1, respectively, thereby positioning the third stator 4 such that an air gap between the rotor 5 and the arc-shaped opposite surface (opposite portion) 4A is set to a predetermined value.

A first side surface 4B of the third stator 4 has a shape and dimensions such as to sandwich the first stator 2 together with a convex portion 1F on the base plate 1 in the state in which the third stator 4 is positioned due to the engagement of the holes 4D and 4E and the pins 1D and 1E on the base plate 1.

On the other hand, in a manner similar to the above, a second side surface 4C of the third stator 4 has a shape and dimensions such as to sandwich the stator 3 together with a convex portion 1G formed on the base plate 1 in the state in which the third stator 4 is positioned due to the engagement of the holes 4D and 4E and the pins 1D and 1E on the base plate 1.

The portions which are sandwiched by the first stator 2 and the second stator 3 are side surfaces 2B and 2D and side surfaces 3B and 3D of the projecting portions on the sides opposite to the opposite portions 2A and 3A which face the rotor for the armature coils 6 and 7.

On the other hand, the third stator 4 is positioned in the direction of the rotational axis by being abutted on mounting bases 1J and 1K formed on the base plate 1 so as to be projected therefrom.

A first plate-shaped yoke 11 made of a magnetic material assists the magnetic coupling between the third stator 4 and the first stator 2. A hole 11A of the first yoke 11 comes into engagement with the third pin 1D formed on the base plate 1. The first yoke 11 is constructed so as to be sandwiched among the first stator 2, the third stator 4, and the base plate 1.

Similarly, a second plate-shaped yoke 12 made of a magnetic material also has a hole 12A. The hole 12A comes into engagement with the fourth pin 1E formed on the base plate 1. The second yoke 12 is constructed so as to be sandwiched among the second stator 3, the third stator 4, and the base plate 1 and assists the magnetic coupling between the second stator 3 and the third stator 4.

A first stop member 9 is made of a material having a spring characteristic, such as phosphor bronze. The first stop member 9 comprises is formed with: a hole 9C adapted to come into engagement with the pin 1D formed on the base plate 1; first and second spring portions 9D and 9E; first and second spring members 9A and 9B having notched portions; and hook portions 9a and 9b formed at the edges of the spring members 9A and 9B.

The first stop member 9 is constructed in a manner such that the hole 9C comes into engagement with the third pin 1D on the base plate 1 and the first and second hook portions 9a and 9b come into engagement with a first projecting portion 1H and a second projecting portion (which is formed on the opposite side and, therefore, is not shown in the diagram) formed on the base plate 1, respectively.

When the first stop member 9 is assembled as described above, the first spring portion 9D presses the first stator 2 in the direction of the rotational axis, and the second spring portion 9E presses the third stator 4 in the direction of the rotational axis. Further, since the spring members 9A and 9B of the stop member 9 are spring based in such a direction as to press the first stator 2 and third stator 4, the first and third stators are forced into pressure contact with each other.

A second stop member 10 is also made of a material having a spring characteristic similar to that of the first stop member 9. The second stop member 10 is formed with: a hole 10C adapted to come into engagement with the fourth pin 1E formed on the base plate 1; first and second spring portions 10D and 10E; first and second spring portions 10D and 10E; first and second spring members 10A and 10B having notched portions; and first and second hook portions 10a and 10b formed at the edges of the spring members 10A and 10B. The second stop member 10 functions in a manner similar to the first stop member 9.

The second stop member 10 is constructed in a manner such that the hole 10C comes into engagement with the pin 1E of the base plate 1 and the first and second hook portions 10a and 10b come into engagement with a third projecting portion 1I and a fourth projecting portion (which is formed on the opposite side and, therefore, is not shown in the diagram) formed on the base plate 1, respectively.

When the second stop member 10 is assembled as described above, the first spring portion 10D presses the second stator 3 in the direction of the rotational axis, and the second spring portion 10E presses the third stator 4 in the direction of the rotational axis in a manner similar to the first stop member 9.

The bearing member 8 comprises: a bearing portion 8A for rotatably supporting one end 5A of the rotary shaft 5D of the rotor 5 consisting of a permanent magnet; first and second holes 8F and 8G which respectively come into engagement with the edge portions (the portions having the smallest diameters) of the pins 1B and 1C formed on the base plate 1; and first to fourth spring portions 8B, 8C, 8D, and 8E.

The bearing member 8 is positioned in a manner such that the center of the bearing portion 8A coincides with the center of a circle which is formed by the magnetic pole portions 2A, 3A, and 4A of the first to third stators 2 to 4 due to the engagement of the first and second holes 8F and 8G and pins 1B and 1C on the base plate 1.

On the other hand, the bearing member 8 is also positioned in the direction of the rotational axis due to the second level shoulder or difference portion of the pins 1B and 1C on the base plate 1 and is fixed to the base plate 1 by thermal caulking, adhesion, or the like.

The bearing member 8 is fixed to the base plate 1 through the pins 1B and 1C. In this state, the first and second spring portions 8B and 8C press the third stator 4 in the direction of the rotational axis, the third spring portion 8D presses the first stator 2 in the direction of the rotational axis, and the fourth spring portion 8E presses the second stator 3 in the direction of the rotational axis, thereby fixing the corresponding stators 2, 3, and 4, respectively.

A flexible printed wiring board 15 is fixed onto the base plate 1. First and second Hall devices 13 and 14, which detect the magnetic pole of the magnet rotor, are fixed at predetermined positions on the board 15.

The flexible printed wiring board 15 is fixed onto the base plate 1 by being inserted into a concave portion 1L formed in the central portion between the mounting bases 1J and 1K to mount the third stator 4. The plate 15 is fixed such that the first and second Hall devices 13 and 14 are attached at predetermined positions for the opposite portions (surfaces) 2A, 3A, and 4A of the first to third stators which face the rotor. Terminals of the Hall devices 13 and 14 are electrically connected to a drive circuit (not shown) through an output terminal portion 15A of the printed wiring board 15.

On the other hand, terminals 6B, 6C, 7B, and 7C of the first and second armature coils 6 and 7 are also electrically connected to the drive circuit.

The drive circuit in this embodiment operates in a manner similar to a drive circuit of a well-known two-phase DC brushless motor. That is, when the first Hall device 13 detects, e.g., the S (South) polarity, a current is supplied to the first armature coil 6 in such a direction that the opposite portion 2A of the first stator 2 is set to the S polarity (or N (North) polarity). On the other hand, when the first Hall device 13 detects, e.g., the N polarity, a current is supplied to the coil 6 in such a direction that the opposite portion 2A of the first stator 2 is set to the N polarity (or S polarity).

On the other hand, the same also applies to the second Hall device 14. When the second Hall device 14 detects, for instance, the S polarity, a current is supplied to the second armature coil 7 in such a direction that the opposite portion 3A of the second stator 3 is set to the N polarity (or S polarity). On the other hand, when the second Hall device 14 detects, e.g., the N polarity, a current is supplied to the coil 7 in such a direction that the opposite portion 3A of the second stator 3 is set to the S polarity (or N polarity). The current supply to each of the coils 6 and 7 is controlled in this manner.

In this embodiment, the first Hall device 13 is attached along a straight line connecting the center of the opposite portion 3A of the second stator 3 and the rotational axis and just under the opposite portion 4A of the third stator 4. On the other hand, the second Hall device 14 is attached along a straight line connecting the center of the opposite portion 2A of the first stator 2 and the rotational axis and just under the rotor opposite portion 4A of the third stator 4. The length of the permanent magnet 5C of the rotor 5 in the direction of the rotational axis is greater than the length of each of the first to third stators 2 to 4 in the direction of the rotational axis. The permanent magnet 5C is projected to the sides of the Hall devices 13 and 14. Therefore, even if each of the Hall devices 13 and 14 is arranged on the surface which is vertical to the rotational axis, a signal corresponding to the S polarity is output when the permanent magnet located just over the Hall device is set to the S polarity, and a signal of the N polarity is output when the magnet is set to the N polarity, respectively.

The rotating the rotor 5 in the motor of the embodiment will now be described with reference to FIGS. 3A–3C.

In FIG. 3A, the first Hall device 13 detects the N polarity and the drive circuit supplies a current to the first coil 6 so that the S polarity is generated in the opposite portion 2A of the first stator 2.

On the other hand, the second Hall device 14 detects the S polarity and the drive circuit supplies a current to the second coil 7 so that the S polarity is generated in the opposite portion 3A of the second stator 3.

At this time, the N polarity is developed in the opposite portion 4A of the third stator 4.

In FIG. 3A, the rotor 5 rotates counterclockwise due to the attraction and repulsion between the permanent magnet of the rotor 5 and the magnetic pole which is generated in each of the stators 2 to 4.

When the rotor 5 rotates by an angle of 45° and reaches a state as shown in FIG. 3B, the center of the opposite portion 2A of the first stator 2 coincides with the center of the magnetic pole of the permanent magnet 5C of the rotor 5, so that the first stator 2 does not generate a torque. However, since the second stator 3 generates a torque in the counterclockwise direction, the rotation of the rotor 5 is continued.

In this state, the drive circuit controls the current supply to the first coil 6 in a manner such that the signal detected by the first Hall device 13 is switched from the N polarity to the S polarity and the magnetic pole which is excited in the opposite portion 2A of the first stator is changed from the S polarity to the N polarity.

When the rotor 5 slightly rotates counterclockwise from the state of FIG. 3B due to the torque which is generated by the second stator 3, the first stator 3 also starts generating a torque. The rotation of the rotor 5 is continued and after the state of FIG. 3C, the rotor 5 rotates to the state of FIG. 3D.

Now, since the magnetic pole which is detected by the second Hall device 14 is changed from the S polarity to the N polarity under the torque which is generated by the first stator 2, the current supply to the second armature coil 7 is switched and the N polarity is excited in the opposite portion 3A of the second stator 3.

For the period of time until the current supply to the second armature coil 7 is switched in the state of FIG. 3D after the current supply to the first armature coil 6 was switched in the state of FIG. 3B, no magnetic pole is developed in the opposite portion 4A of the third stator 4. A torque is generated due to the magnetic poles which are generated in the opposite portions 2A and 3A of the first and second stators 2 and 3, so that the rotation of the rotor 5 is continued.

In a manner similar to the above, the rotor 5 continues to rotate in the counterclockwise direction and thereafter, the current supply to the first armature coil 6 is switched in a state of FIG. 3F and the current supply to the second armature coil 7 is switched in a state in FIG. 3H, so that the rotation can be continued.

In this embodiment, since the opposite portions 2A to 4A of the stators 2 to 4 are constructed so as to cover almost the whole surface of the rotor 5, the magnetic fluxes can be effectively used and strong torque can be obtained and a motor of an extremely small cogging torque can be derived.

Although the rotor 5, which is magnetized with two poles has been used in the first embodiment of FIGS. 1 to 3, the present invention is not limited with respect to the number of magnetization poles of the rotor 5.

In the first embodiment, the opposite portion of the third stator 4 on the opposite side in the direction of a diameter of the opposite portion 2A of the first stator 2 and the opposite portion of the third stator 4 on the opposite side in the direction of the diameter of the opposite portion 3A of the second stator 3 have been connected as parts if the circumference 4A of the same circle. However, they can be also separated. By separating those opposite portions, such an effect that a stable stop point due to the cogging torques of a predetermined number can be easily accomplished.

Figure 4:
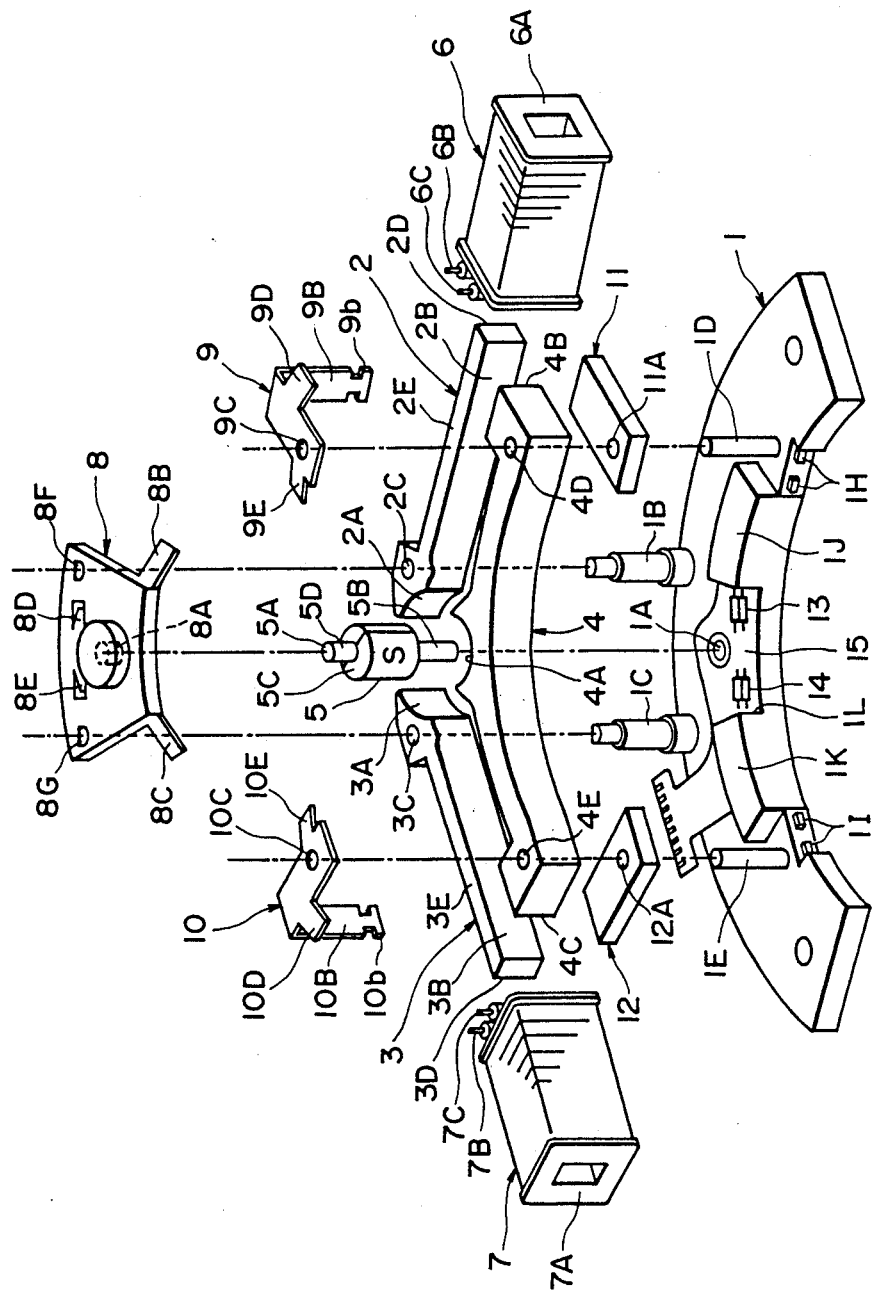

FIG. 4 shows a modification of the stop members 9 and 10 and base plate 1 according to the invention.

In the example shown in FIG. 1 with regard to the stop members 9 and 10, two spring members are provided and each of the first and third stators 2, 4 and the second and third stators 3,4 are pressed and sandwiched by the spring members 9A and 9B and the spring members 10A and 10B.

The stop members 9 and 10 shown in FIG. 4 can be also constructed in a manner such that as shown in the diagram, one spring member is provided. Moment forces in which the engagement pins 1D and 1E are set to axial centers act on the first and second stators 2 and 3 due to the spring force of the spring member, and thereby press the first and second stators 2 and 3 to the contact portions 4B and 4C of the third stator 4. On the other hand, the projecting portions 1F and (FIG. 7) on the base plate 1 can be also omitted by improving the dimensioned accuracy of each part.

Figure 5:
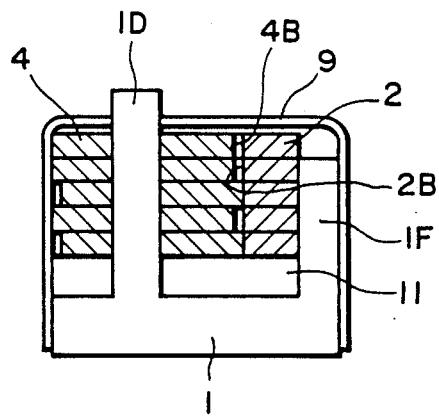
Figure 6:
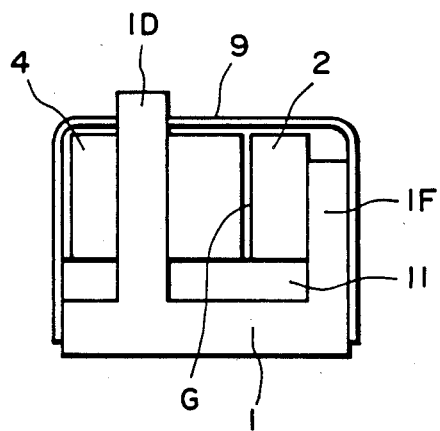

FIGS. 5 and 6 are cross sectional views of magnetic coupling portions of the first stator 2 and third stator 4 each of which is constructed of laminated sheet steel.

In FIG. 5, in the case of the stators 2 and 4 being constructed of laminated sheet steel, as shown in the diagram, concave and convex portions are formed on the surfaces 2B and 4B to which the stators 2 and 4 are mutually magnetically coupled due to a variation in working of each sheet steel and a variation in lamination. When the stators 2 and 4 are merely abutted, enough magnetic coupling cannot be derived.

However, in the brushless motor in FIGS. 1 and 2, the first yoke 11 (FIG. 5) made of a magnetic material and serving as an auxiliary magnetic path member has been arranged so as to ride over the abutting portions 2B and 4B (FIG. 5) of the first stator 2 and third stator 4. Therefore, sufficient magnetic coupling is obtained between the first yoke 11 and the first stator 2 and between the first yoke 11 and the third stator 4. Enough magnetic flux enters the third stator 4 from the first stator 2 through the first yoke 11, so that sufficient magnetic coupling between the first stator 2 and the third stator 4 can be obtained.

On the other hand, when the air gaps are formed at a high dimensional accuracy, as shown in FIG. 6, there is case where a gap G occurs between the stators 2 and 4 due to a variation in shapes of the parts of the stators 2 and 4.

However, in such a case, enough magnetic coupling between the first stator 2 and the third stator 4 can be also obtained through the first yoke 11 which functions as the auxiliary magnetic path member.

On the other hand, the surfaces 3B and 4C (FIG. 1), which are directly abutted, are also provided between the second stator 3 and the third stator 4. Further, the second yoke 12 (FIG. 1) magnetic path member is arranged as an auxiliary so as to ride over those abutting portions.

Therefore, with respect to the magnetic coupling between the second stator 3 and the third stator 4, the same result is derived as in the case of the magnetic coupling between the first stator 2 and the third stator 4.

Figure 7:
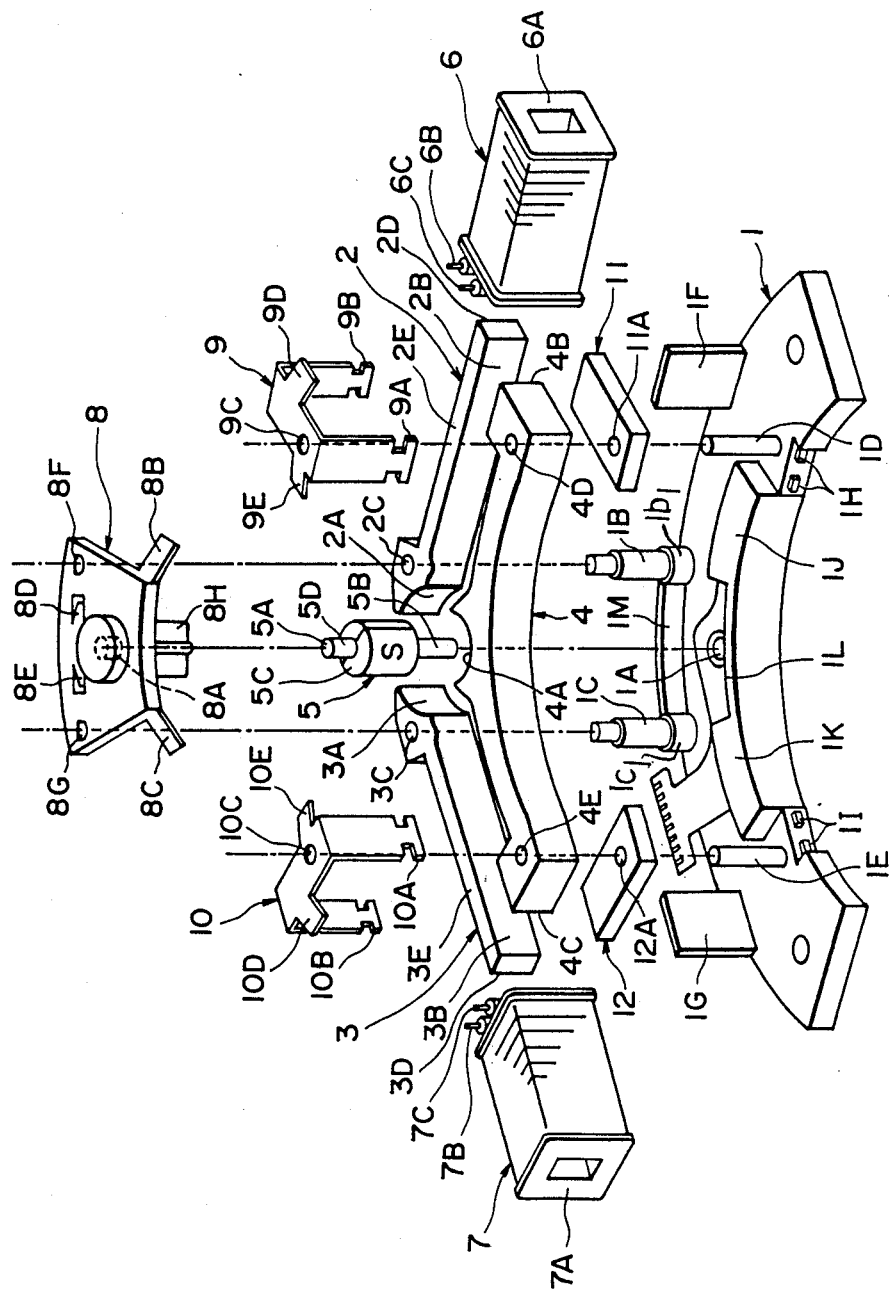

FIG. 7 shows another modification of the embodiment of FIGS. 1 to 3. This modification relates to a structure to prevent dusts such as fine particles and the like, from being deposited on the magnet rotor.

In FIG. 7, the same parts and components as those in FIG. 1 are designated by the same reference numerals.

In this modification, in order to prevent particles, dust, and the like from being attracted and deposited onto the magnet rotor 5, the gaps among the stators around the outer periphery of the magnet rotor are closed. A rib 1M is formed between large diameter portions $1b_1$ and $1c_1$ of the first and second pins 1B and 1C.

In addition to the components shown in FIG. 1, a gap closing portion 8H is formed under the bearing member 8 so as to be vertically extended from the lower surface of the bearing member 8. The gap closing portion 8H is formed so as to close the gap between the edges of the arc-shaped magnetic pole portions of the first stator 2 and second stator 3.

According to this construction, the first stator 2 comes into engagement with the first pin 1B, the second stator 3 comes into engagement with the second pin 1C and the third stator 4 is mounted on the projecting portions 1J and 1K comes into engagement with the third and fourth pins 1D and 1E, in the assembly of those stators. Further, the gap closing portion 8H is assembled so as to close the gap between the first and second stators. Thus, most of the gaps around the outer periphery of the magnet rotor 5 are closed, thereby making it possible to prevent dust and particles entering and being attracted and deposited onto the rotor.

Figure 8:
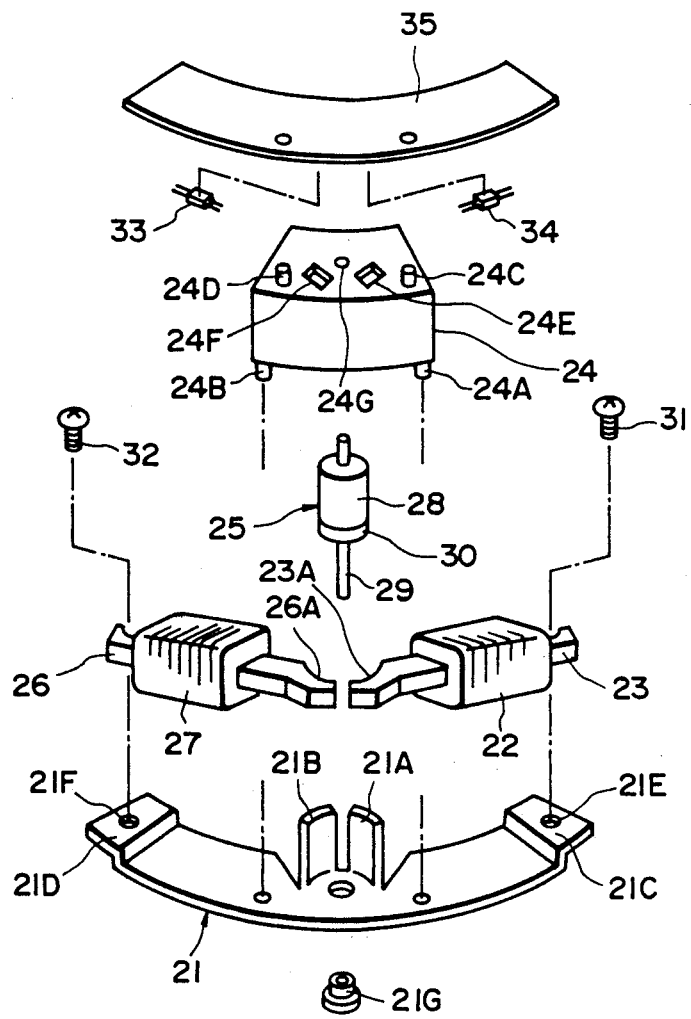
Figure 9:
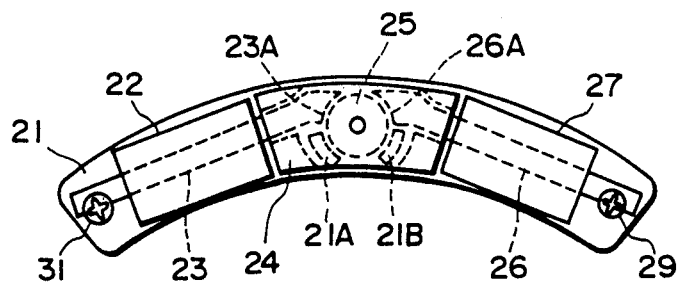
Figure 10:
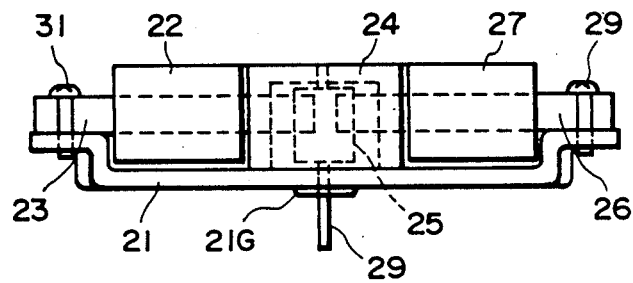

FIG. 8 is an exploded perspective view of a brushless motor according to the second embodiment of the invention. FIG. 9 is a plan view of the motor of FIG. 8. FIG. 10 is a front view of the motor of FIG. 8.

In FIGS. 8, which 10, a bearing 21G to axially supports a rotor 25, is fixed to the central portion of an arc-shaped stator 21 which forms a magnetic circuit. Two opposite portions (magnet pole portions) 21A and 21B, which face a magnet 28 of the rotor 25, are formed along an arc surface in which the bearing 21G is set.

Bearing surfaces 21C and 21D are formed at slightly elevated positions at opposite ends of the fan-shaped stator 21. Screw holes 21E and 21F, to attach the rear edge portions of stators 23 and 26, are formed in the bearing surfaces 21C and 21D, respectively.

Exciting coils 22 and 27 are wound around the elongated stators 23 and 26 arranged along the stator 21, respectively. The stators 23 and 26 are attached to the stator 21 by fixing their rear edge portions to the screw holes 21E and 21F by screws 31 and 32, respectively.

The reason why the bearing surfaces 21C and 21D are slightly elevated is to avoid interference with the stator 21 when the exciting coils 22 and 27 are wound around the stators 23 and 26.

Opposite magnetic pole portions 23A and 26A, which face the peripheral surface of the magnet of the rotor 25, are provided at different positions of the stators 23 and 26.

The rotor 25 has its cylindrical magnet 28 magnetized to N or S polarities of, e.g., 2, 4, or 6 poles. The stators 21, 23, and 26 are assembled so that their opposite pole portions 21A, 21B, 23A, and 26A face the peripheral surface of the magnet 28.

In this manner, the stator 21 having no coil is integrated and the two stators 23 and 26 having the coils 22 and 27 are attached to the stator 21, thereby constructing an arc-shaped motor.

That is, there is constructed an arc-shaped brushless motor comprising: the first stator 23 having the opposite pole portion 23A which faces the magnet 28 of the rotor 25; the second stator 26 having the similar opposite pole portion 26A at a different position around the rotor; and the third stator 21 having the opposite pole portions 21A and 21B at further different positions around the rotor.

The rotor 25 has a structure such that the coaxial shaft 29 is provided to support the cylindrical magnet 28. However, in the example shown in the diagram, a magnetic shielding member 30 is fixed to the lower edge surface of the magnetic 28 in the axial direction on the side of the third stator 21. The magnetic shielding member 0 is used to short-circuit the leakage magnetic flux from the edge surface of the magnet 28 to the third stator 21.

The magnet 28 is magnetized to $2N(N=1, 2, \ldots)$ poles (N=2 in the example shown) in the circumferential direction and is rotatably axially supported by the shaft 29 together with the disk-shaped magnetic shielding member 30 fixed to the lower edge surface of the magnet 28.

In the brushless motor of FIGS. 8 to 10, the first stator 23 is positioned and fixed by a single guide member 24 such that an air gap between the second stator 26 and the magnet 28 is held to a predetermined value. Likewise, the third stator 21 is positioned and fixed by the guide member 24 such that air gaps among the opposite pole portions 23A, 26A, 21A, and 21B and the magnet 28 are held to the foregoing predetermined value.

On the other hand, the guide member 24 also serves as a housing member for surrounding parts or all of the outer periphery of the opposite portions 23A, 26A, 21A, and 21B of the first to third stators 23, 26, and 21 and for closing the gaps thereamong.

The guide member (housing member) 24 can be formed of plastic (it is preferable to use engineering plastics whose dimensional accuracy and strength are excellent) or it can be made of a non-magnetic material such as aluminum or the like.

The guide member (housing member) 24 is positioned by dimples 24A and 24B and is attached to the central portion of the arc-shaped third stator 21.

Figure 11:
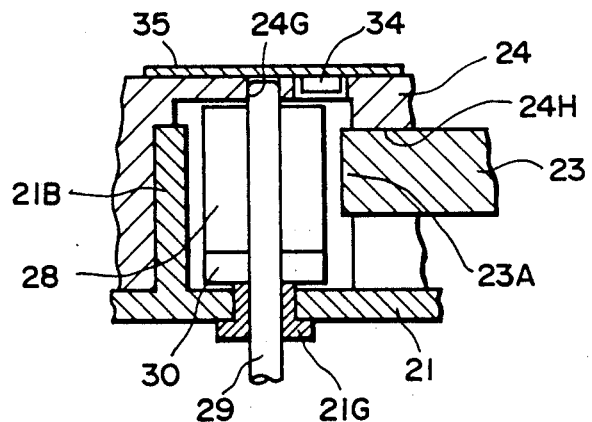
Figure 12:
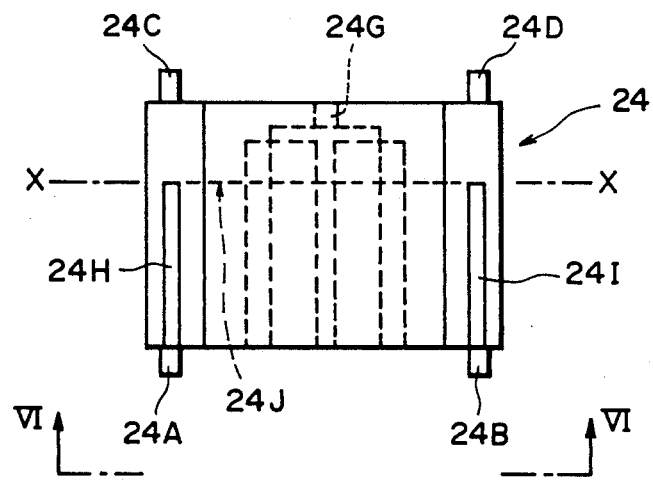
Figure 13:
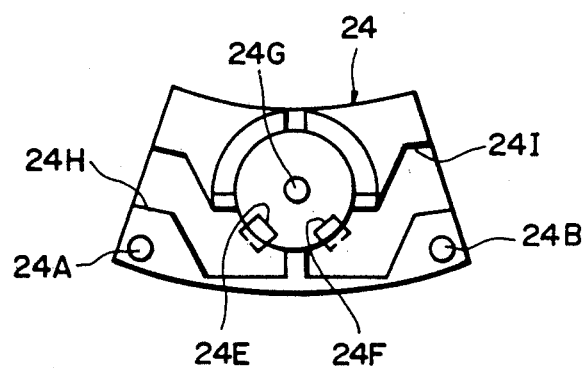

FIG. 11 is a vertical sectional view of the rotor 25 and its peripheral parts FIGS. 12 and 13 are a front view and a bottom view of the guide member (housing member) 24.

As shown in FIGS. 11 to 13, the guide member 24 is formed with a concave portion shaped so as to guide and receive the end portions of the rotor 25, the opposite pole portions 21A and 21B of the third stator 21, and the opposite pole portions 23A and 26A of the first and second stators 23 and 26. This concave portion opens toward the third stator 21.

In this manner, the guide member (housing member) 24 surrounds the outer peripheries of the magnetic pole portions 23A, 26A, 21A, and 21B which face the rotor 25 thereby preventing dust from being deposited on to the magnet 28 of the rotor 25 and preventing dust from entering the air gap between the rotor 25 and each of the magnetic pole portions.

As shown in FIGS. 11 to 13, notched guide hole portions 24H and 24I, which are adapted to come into engagement with the first and second stators 23 and 26, are formed in the side surface portions of the guide member 24, respectively. Portions of the first and second stators 23 and 26 are positioned by the guide hole portions 24H and 24I. Movement of the stators 23 and 26 is prevented by the attractive and repulsive forces among the rotor 25 and the magnetic pole portions 23A and 26A.

Further, because of the guide member guide hole portions 24H and 24I, vibration of the stators 23 and 26 due to attractive and repulsive forces can be absorbed, and this enables reduction of the motor noise during operation.

A bearing hole 24G (FIGS. 8 and 11 to 13) for axially supporting the shaft 29 of the rotor 25 is also formed in a closing upper portion 24J (FIG. 12) of the guide member (housing member) 24.

In FIG. 8, the guide member 24 is accurately positioned with the integrated third stator 21 by the dimples 24A and 24B described above. By integrally forming the bearing hole 24G in the guide member 24, a high degree of accuracy can be assured in regard to the coaxial structure of the bearing hole 24G and the bearing 21G provided for the stator 21. Therefore, the shaft 29 of the rotor 25 can be axially supported at a high precision without oscillation.

Holes 24E and 24E, to position Hall devices 33 and 34 which detect the rotating position of the rotor 25, are formed in the closing upper portion 24J of the guide member 24 in addition to the bearing hole portion 24G.

In the brushless motor, the positional relations among the magnetic pole portions 23A, 26A, 21A, and 21B and the position sensors (the Hall devices 33 and 34 in this embodiment) of the rotor 25 are a significant factor which exerts an influence on the characteristics of the motor. By assembling those parts with a high degree of accuracy, the difference of the rotational speeds due to the rotating direction and variation in output torque can be reduced.

In this case, by forming the positioning holes 24E and 24F of the Hall devices 33 and 34 in the guide member (housing member) 24 which is assembled to the rotor 25 and stators 23, 26, and 21 with high precision, and by soldering the Hall devices 33 and 34 onto a wiring board 35 (FIGS. 8 and 11), the deviation of the wiring pattern outer shape, and the like due to the positional deviation of the Hall devices 33 and 34 and the limitation of manufacturing accuracy of the wiring board 35 are corrected, thereby enabling the Hall devices 33 and 34 at be attached to the optimum positions.

The wiring board 35 may be formed by a non-flexible plate made of a glass epoxy base. However, if a flexible, printed board made of polyimide or the like is used as a base material, the wiring board 35 can be bent, so that the two Hall devices 33 and 34 can be further easily attached to the optimum positions.

The wiring board 35 is used to wire not only the Hall devices 33 and 34 but also the exciting coils 22 and 27.

In FIG. 11 which shows the rotor 25 and its peripheral parts, the magnetic shielding member 30 prevents the magnetic flux generated by the rotor magnet 28 from passing through the magnetic pole portions 23A, 26A, 21A, and 21B. Instead this flux directly flows to the base portion (peripheral portion the bearing 21G) of the third stator 21. For this purpose, the magnetic shielding member 30 is made of a magnetic material such as pure iron, silicon iron, or the like.

The force by which the magnet 28 is attracted to the stator 21 can be eliminated by preventing the magnetic flux from directly flowing from the magnet 28 to the stator 21 without passing through the magnetic pole portions.

Therefore, by providing the magnetic shielding member 30, the magnetic flux can be effectively used, the frictional resistance between the edge surface of the rotor 25 and the bearing 21G can be reduced, and the efficiency of the motor can be improved.

The above-described effect can be further raised by inserting a member such as a polyslider or the like having a small frictional resistance into the portion between the magnetic shielding member 30 and the bearing 21G.

In FIGS. 8 and 12, dimples 24C and 24D, which locate the assembling position of the wiring board 35, are formed in the upper portion of the guide member (housing member) 24.

Although one brushless motor according to the embodiment of the invention has been described above, the same drive circuit as used with the well-known two-phase brushless motor can be used as the drive circuit of the motor in the same embodiment.

FIG. 14 shows a rotating state of the rotor 25 driven by the drive circuit.

In a portion shown in FIG. 14A, the N polarity of the rotor 25 is away from the N polarity of the magnetic pole portion 23A of the first stator 23 and the S polarity of the rotor 25 is away from the S polarity of the magnetic pole portion 21B of the third stator 21.

Further, since the magnetic pole portion 26A of the second stator 26 is set to the N polarity, the S polarity of the rotor 25 is attracted to this N polarity. Since the magnetic pole portion 21A of the third stator 21 is set to the S polarity, the N polarity of the rotor 25 is attracted to the S polarity of the magnetic pole portion 21A of the third stator 21.

Thus, the rotor 25 rotates counterclockwise from the state of FIG. 14A.

When the rotor 25 rotates counterclockwise by an angle of 45° and arrives at a position of FIG. 14B, the output of the Hall device 34 is inverted, thereby reversing direction of the current supplied to the exciting coil 27 by the drive circuit.

Thus, as shown in FIG. 14B, the magnetic pole portion 26A of the second stator 26 changes from the N polarity to the S polarity and the magnetic pole portion 21A of the third stator 21 changes from the S polarity to the N polarity.

At this time, the S polarity of the rotor 25 is away from the S polarities of the magnetic pole portion 26A of the second stator 26 and of the magnetic S pole portion 21B of the third stator 21, thereby generating a counterclockwise torque. Further, the S polarity of the rotor 25 is attracted to the N polarity of the magnetic pole portion 23A of the first stator 23, thereby generating a torque in the same counterclockwise direction.

In the position showing in FIG. 14B, the N polarity of the rotor 25 is away from the N polarities of the magnetic pole portion 23A of the first stator 23 and of the magnetic pole portion 21A of the third stator 21 and is attracted to the S polarity of the magnetic pole portion 21B of the third stator 21. In this case, counterclockwise torques are generated and the rotation is continued.

In this manner, the rotor 25 rotates from the position shown in FIG. 14B to the portion shown FIG. 14C and reaches a position shown in FIG. 14D.

At the position of FIG. 14D, the output of the Hall device 33 is inverted, thereby reversing the direction of current supplied to the exciting coil 22 of the first stator 23, so that the counterclockwise rotation is continued.

Further, when the rotor passes through the portion shown FIG. 14E and reaches a position shown in FIG. 14F, the output of the Hall device 34 is inverted and the direction of current supplied to the exciting coil 27 of the second stator 26 is reversed. Thus, the polarities of the magnetic pole portion 26A of the stator 26 and of the magnetic pole portion 21A of the third stator 21 are inverted as shown in the diagram and the counterclockwise rotation is continued in a manner similar to the above.

In the case of reversing the rotation of the motor from the counterclockwise rotation of FIG. 14 to clockwise rotation, the rotating direction of the rotor 25 can be reversed to the clockwise direction by inverting the polarity of the voltages which are applied to the exciting coils 22 and 27 shown in FIG. 14.

Figure 15:
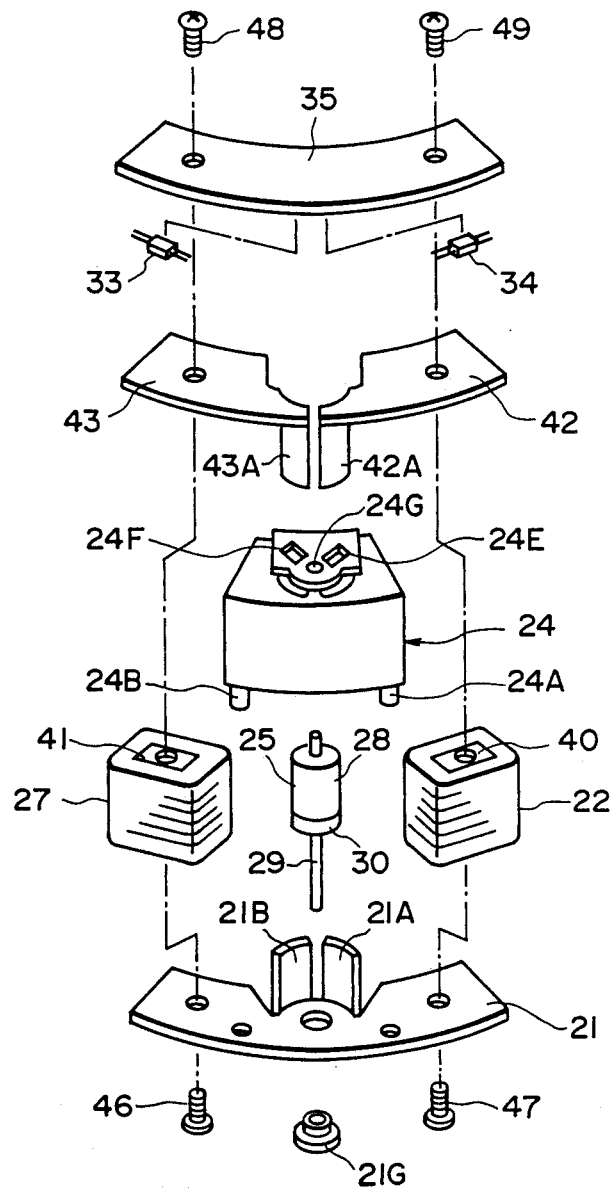

FIG. 15 is an exploded perspective view of a brushless motor according to a modification of the invention and corresponds to FIG. 8.

In this embodiment, the assembling direction of each of the exciting coils 22 and 27 is changed to a perpendicular direction from that in the case of FIG. 8. The third stator (integrated stator) 21 is connected to a first stator 42 by an iron core 40. The third stator (integrated stator) 21 is connected to a second stator 43 by an iron core 41. In this manner, each magnetic circuit is formed.

The magnetic pole portions 21A and 21B of the third stator 21 are constructed so as to have substantially the same shape as that in the case of FIG. 8. However, the first stator 42 and the second stator 43 are arranged so as to come into contact with the upper surface of the guide member (housing member) 24. The magnetic pole portions of the first and second stators 42 and 43, that is, as shown in FIG. 15, opposite portions 42A and 43A which face the magnet 28 are formed in an arc-shape in such a manner as to be inserted and fitted into the guide holes formed on the upper surface of the guide member 24 and projected downward to the positions which face the peripheral surface of the magnet 28 of the rotor 25 of the inner portion (concave portion) of the guide member 24.

On the other hand, the brushless motor shown in FIG. 15 has a structure such that the third stator 21 is fastened to the lower surfaces of the iron cores 40 and 41 from the lower side by using screws 46 and 47 through the guide member 24, which is positioned by the dimples 24A and 24B, and through the iron cores 40 and 41 of the two exciting coils 22 and 27, and that the wiring board 35 and the first and second stators 42 and 43 are fastened to the upper surfaces of the iron cores 40 and 41 from the upper side by using screws 48 and 49, thereby positioning and fixing these members.

The rotor 25 is axially supported by the bearing 21G provided in the third stator 21 and by the bearing hole 24G of the guide member 24 in substantially the same manner as in the case of FIG. 8.

The portions other than the foregoing parts in the embodiment of FIG. 15 have substantially the same structure as their corresponding portion in the embodiment of FIG. 8 and the parts and components corresponding to those in FIG. 8 are designated by the same reference numerals and their detailed descriptions are omitted.

According to the structure of the embodiment of FIG. 15, as compared with the structure of FIG. 8, the assembling direction of the exciting coils 22 and 27 has been changed to the perpendicular direction, so that the motor can be further miniaturized.

According to the structure of the embodiments described above in conjunction with FIGS. 8 to 15, the following effects are obtained.

(1) Since parts of the two independent magnetic circuits are commonly constructed by using the integrated third stator 21, the number of parts can be reduced and the structure can be simplified.

(2) The first stator 23 (42), second stator 26 (43), and third stator 21 are positioned and fixed by the single guide member 24 (having a concave portion including the guide holes 24H and 24I and the like) in order to keep the air gaps among the opposite magnetic pole portions 23A, 26A, 21A, and 21B (42A and 43A) and the magnet 28 of the rotor 25 at a predetermined value. The positional relationship between the guide member 24 and the third stator 21 is held to high accuracy by the dimples 24A and 24B. Further, the rotor 25 is axially supported by both the bearing 21G of the third stator 21 and the bearing hole 34G of the guide member 24. Therefore, the air gaps among the opposite portions magnetic pole portions 23A, 26A, 21A, and 21B (42A and 43A) of the stators and the magnet 28 of the rotor 25 can be easily set to a predetermined value at a high accuracy.

(3) Since the first stator 23 (42) and second stator 26 (43) can be assembled in parallel on the third stator 21 as a common stator, it is possible to realize a structure such as to two-dimensionally restrict the positional relationships among the parts. Therefore, the accuracy of the complete product can be easily guaranteed like the accuracy of a single part. The adjusting steps upon assembly can be eliminated. Reduction of cost due to the decrease in number of steps also can be accomplished.

(4) Since there is provided the housing member (guide member) 24 which surrounds parts or all of the outer periphery of the opposite magnetic pole portion 23A (42A), 26A (43A), 21A, and 21B of the stators 23 (42), 26 (43), and 21, the entrance and deposition of dust and fine particles on the rotor 25 and magnetic pole portions can be prevented. The reliability and durability of the motor can be improved irrespective of the use circumstances.

(5) Since the magnetic shielding member 30 is fixed to the edge surface of the axial direction of the rotor 25, the magnetic flux generated from the magnet 28 can be prevented from directly leaking to the stators without passing through the magnet pole portions. The magnetic efficiency of the motor can be improved. An increase in frictional resistance between the rotor 25 and the bearing 21G due to force on the rotor 25 in the direction of the rotational axis can be prevented. The efficiency of the motor can be improved.

(6) Since the bearing hole portion 24G of the rotor 25 and the holes 24E and 24F for positioning the Hall devices 33 and 34 are formed integrally with the guide member (housing member) 24, the number of bearing parts can be reduced and the Hall devices can be easily attached at a high accuracy.

As will be obvious from the above description, according to the invention, a brushless motor comprises: the first stator having an opposite portion which faces the magnet of the rotor; a second stator having a similar opposite portion at a different position; and a third stator having opposite portions constituting the opposite portions on the other sides of the first and second stators at further different positions, wherein the first to third stators are positioned and fixed by a single guide member so as to keep the air gaps among the opposite portions and the magnet to a predetermined value. Thus, there is obtained a brushless motor in which the number of parts is small, the structure is simple, and the respective parts can be easily assembled at a high precision without needing adjusting steps upon assembly.

What is claimed is:

1. A motor comprising:
   a magnet rotor having a rotational shaft; and
   first, second and third stator members arranged around an outer periphery of said magnet rotor while keeping a uniform air gap,
   said first stator member being formed as a shaft and having a first arc-shaped magnetic pole portion having an opening angle of about 90° and a coil supporting portion around which a first field coil is wound at one end of the first stator member,
   said second stator member being formed as a shaft and having a second arc-shaped magnetic pole portion having an opening angle of about 90° and a coil supporting portion around which a second field coil is wound at one end of the second stator member, and
   said third stator member having third and fourth continuous magnetic pole portions having an opening angle smaller than 180° in a central portion of the third stator member and contacting portions which are in contact with edges of said coil supporting portions of the first and second stator members at both ends of said third and fourth magnetic pole portions, and magnetic circuits constructed by each of the magnetic pole portions of the first and second stator members and each of the magnetic pole portions of the third stator member through said contacting portions, respectively;
   a base plate having a member for determining an axially supporting position of said magnet rotor and assembling positions of said first, second, and third stator members;
   first and second pin members adapted to be fitted into holes formed near each of the first and second magnetic pole portions of the first and second stator members; and
   third and fourth pin members adapted to be fitted into holes formed near said contacting portions of said third stator member.

2. A motor according to claim 1, further comprising a stop member, and wherein said stop member has:
   engagement holes adapted to come into engagement with said third and fourth pin members of said base plate; and
   a first spring member to elastically press side surfaces of said first and second stator members.

3. A motor according to claim 2, wherein said stop member has:
   a second spring member for elastically pressing a side surface of said third stator member; and
   retaining means for retaining said first and second spring members to retaining portions formed on a pressing surface of each of said stators.

4. A motor according to claim 1, further comprising:
   an auxiliary yoke member which is formed with holes adapted to be come into engagement with the third and fourth pin members of said base plate and which forms magnetic paths of said first and second stator members and said third stator member.

5. A motor according to claim 1, further comprising:
   mounting base portions formed on said base plate to thereby mount the third stator member and a concave portion which is formed between said mounting base portions; and
   a level difference portion of a large diameter which is formed for each of the first and second pin members,
   and wherein height positions of said first, second and third stator members are determined by said mounting base portions and said level difference portions.

6. A motor according to claim 5, further comprising:
   a flexible printed board having a device to detect a magnetic polarity of said magnet rotor,
   and wherein on said flexible printed board, at least said detecting device is arranged on said concave portion.

7. A motor according to claim 6, further having:
   a rib portion which is formed between the first and second pin members of said base plate so as to be upwardly projected from the surface of the base plate,
   and wherein said field coils are wound around bobbins, air-cores of the bobbins are penetrated by said first and second stator members, and the periphery of said magnet rotor is surrounded by the bobbins and said rib portion.

* * * * *

UNITED STATES PATENT AND TRADEMARK OFFICE
CERTIFICATE OF CORRECTION

PATENT NO. : 4,958,099

DATED : September 18, 1990

INVENTOR(S) : Tatsuo Chigira et al.

It is certified that error appears in the above-identified patent and that said Letters Patent is hereby corrected as shown below:

COLUMN 1:

Line 26, "shutter" should read --shutter.--.

Line 40, "arranged" should read --arranged.--.

Line 43, "a -character shape." should read --a /\-character shape.--.

COLUMN 2:

Line 41, "an perspective" should read --an exploded perspective--.

COLUMN 3:

Line 21, "stance," should read --stance, laminated-- and "like" should read --as--.

Line 26, "penetrate" should be deleted.

Line 37, "a shoulder constituting" should be deleted.

UNITED STATES PATENT AND TRADEMARK OFFICE
CERTIFICATE OF CORRECTION

PATENT NO. : 4,958,099

DATED : September 18, 1990

INVENTOR(S) : Tatsuo Chigira et al.

It is certified that error appears in the above-identified patent and that said Letters Patent is hereby corrected as shown below:

Line 39, "the" should read --first and--.

Line 57, "a rotational" should read --the rotor--.

Line 63, "steel" should read --steel, and--.

COLUMN 4:

Line 57, "comprises" should be deleted.

COLUMN 5:

Line 27, "base plate 1" should read --base plate 1,--.

COLUMN 6:

Line 49, "rotor" should be deleted.

Line 50, "stator 4. The" should read --stator 4. ¶The--.

Line 51, "in the direction of the rota-" should be deleted.

Line 52, "tional axis" should be deleted.

UNITED STATES PATENT AND TRADEMARK OFFICE
CERTIFICATE OF CORRECTION

PATENT NO. : 4,958,099

DATED : September 18, 1990

INVENTOR(S) : Tatsuo Chigira et al.

It is certified that error appears in the above-identified patent and that said Letters Patent is hereby corrected as shown below:

Line 62, "The" should read --The operation of--.

COLUMN 8:

Line 22, "and" should read --and 1G--.

Line 24, "dimensioned" should read --dimensional--.

COLUMN 9:

Line 1, "dusts" should read --dust,--.

COLUMN 10:

Line 13, "magnetic 28" should read --magnet 28--.

Line 15, "ber 0" should read --ber 30--.

Line 18, "2N(N=1," should read --2N (N=1,--.

Line 47, "parts" should read --parts,--.

Line 60, "25" should read --25,--.

UNITED STATES PATENT AND TRADEMARK OFFICE
CERTIFICATE OF CORRECTION

PATENT NO. : 4,958,099
DATED : September 18, 1990
INVENTOR(S) : Tatsuo Chigira et al.

It is certified that error appears in the above-identified patent and that said Letters Patent is hereby corrected as shown below:

Line 63, "the" should read --the opposite--.

COLUMN 11:

Line 24, "24E," should read --24F,--.

Line 43, "like" should read --like,--.

Line 45, "tion" should read --tions--.

Line 47, "at" should read --to-- and after "attached," "to" should read --at--.

Line 62, "portion" should read --portion of--.

COLUMN 12:

Line 41, "ing" should read --ing the--.

Line 50, "S" should be deleted.

UNITED STATES PATENT AND TRADEMARK OFFICE
CERTIFICATE OF CORRECTION

PATENT NO. : 4,958,099

DATED : September 18, 1990

INVENTOR(S) : Tatsuo Chigira et al.

It is certified that error appears in the above-identified patent and that said Letters Patent is hereby corrected as shown below:

COLUMN 14:

Line 22, "portions" should be deleted.

Line 39, "portion" should read --portions--.

COLUMN 16:

Line 17, delete "be".

Signed and Sealed this

Twenty-second Day of December, 1992

Attest:

DOUGLAS B. COMER

Attesting Officer

Acting Commissioner of Patents and Trademarks